(No Model.)
G. L. CARLL.
JAR.
No. 381,331. Patented Apr. 17, 1888.
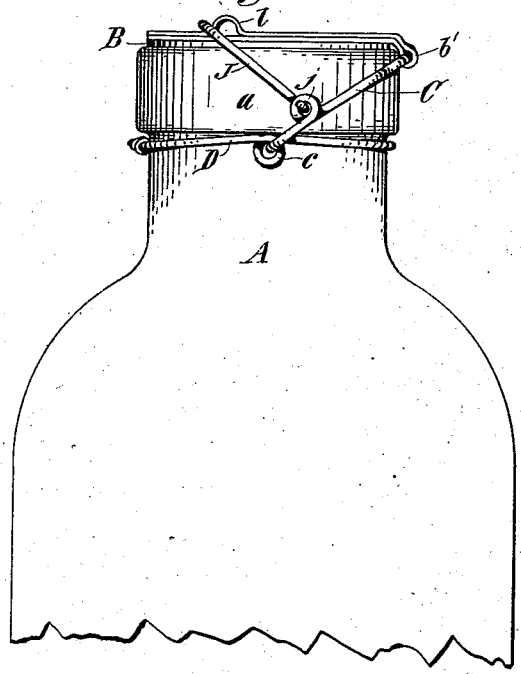
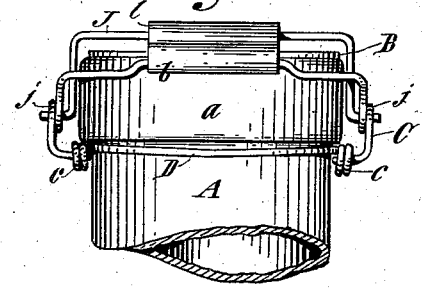
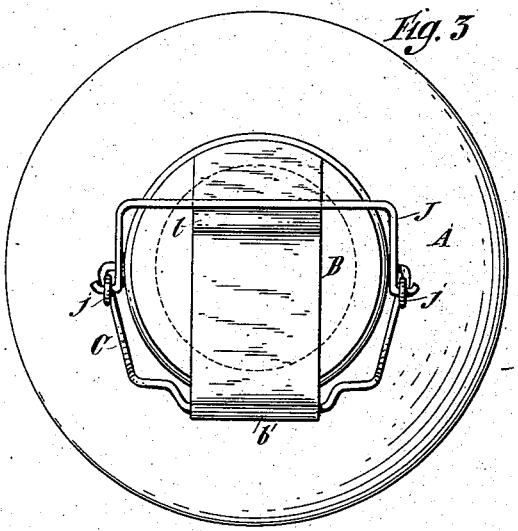
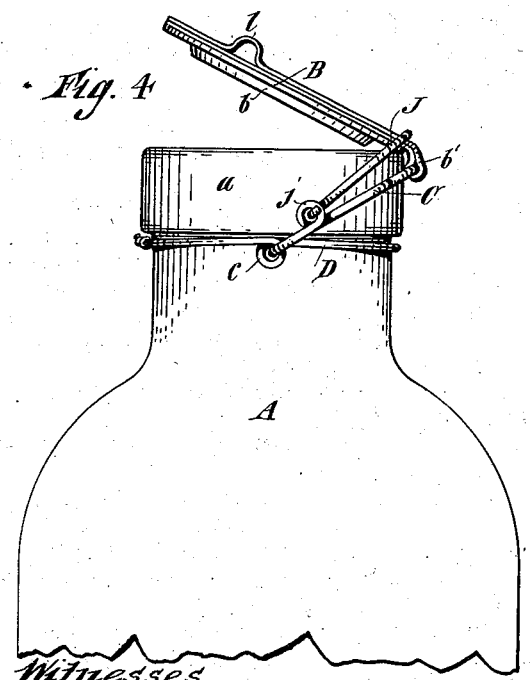
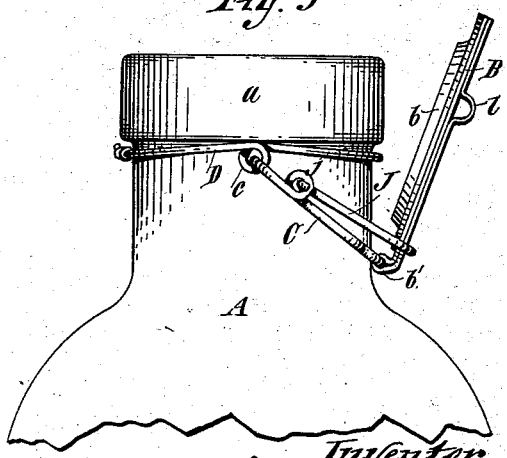
Witnesses
James D. Griswold
Maurice J. Roach
Inventor
G. Lester Carll
By his attorneys
Gifford & Brown

UNITED STATES PATENT OFFICE.

GEORGE L. CARLL, OF BROOKLYN, ASSIGNOR TO ABRAHAM V. WHITEMAN, OF PORT CHESTER, NEW YORK.

JAR.

SPECIFICATION forming part of Letters Patent No. 381,331, dated April 17, 1888.

Application filed October 21, 1887. Serial No. 253,026. (No model.)

*To all whom it may concern:*

Be it known that I, GEORGE L. CARLL, of Brooklyn, New York, have invented a certain new and useful Improvement in Jars, of which the following is a specification.

My improvement relates more especially to jars for containing milk.

I will describe a jar embodying my improvement in detail, and then point out the novel features in claims.

In the accompanying drawings, Figure 1 is a side elevation of a jar embodying my improvement, only a portion of the jar being shown and the cover being shown as closed. Fig. 2 is a similar view looking at the jar from a different side from that shown in Fig. 1. Fig. 3 is a plan or top view of the same. Fig. 4 is a side view showing the cover partly removed. Fig. 5 is a similar view showing the cover wholly removed.

Similar letters of reference designate corresponding parts in all the figures.

A designates the jar. It may be made of glass and of the usual or any ordinary construction. It is provided with an open-topped mouth portion, $a$.

B designates a cover for the jar. This cover will preferably be made of metal. As shown, it has a rim, $b$, upon its under side adapted to fit within the opening at the mouth of the jar when the cover is in position to close said mouth.

C designates a bail pivoted at its ends in loops $c$, formed in a wire securing-piece, D, extending about the neck of the bottle. Upon the cover B is a loop, $b'$, extending, as shown, downwardly from the edges thereof. The bail C extends through this loop, and the cover may be swung freely on the bail.

J designates another bail. In the example of my improvement shown this bail is pivoted near its ends in loops $j$, formed by bending the wire forming the bail C. The bail J may be swung freely in the loops $j$ over the cover B. It will be observed that the cover B is provided upon its upper side with a projection, $l$. Referring more particularly to Figs. 1, 2, and 3, the bail J is shown as swung forward and in front of the projection $l$. When in this position, the bail J operates as a lock for securing the cover in position on the jar. When the bail J is swung backwardly into the position shown more clearly in Fig. 4, the bail bears upon the rear part of the cover above the loop $b'$. By then pressing downwardly upon the loop J the latter operates as a lever to force the cover wholly from over the jar and into the position shown in Fig. 5. Of course, if the bail J contacted with the bail C instead of the cover, when moved into a position to remove the cover, the effect would be the same. When it is desired to close this cover over the jar, it is but necessary to grasp the bails C J and swing the cover up into position, when the bail J is moved forward over the projection $l$, whereby the cover will be securely held upon the jar.

I have shown the loop $b'$ and the projection $l$ as formed in an independent strip of metal, which latter is secured by solder or otherwise to the cover; but it is obvious that both the loop and the projection may be made integral with the cover, the loop forming merely an extension of the metal forming the cover upon one side and the projection being stamped up in a suitable die.

It will be seen that when the cover is removed wholly from the jar, as shown more clearly in Fig. 5, the cover is supported by the bail J.

By my improvement a very simple and effective means is afforded for not only securing the cover upon the jar, but also for moving the cover into position over the jar and moving it out of such position.

What I claim as my invention, and desire to secure by Letters Patent, is—

1. The combination, with a jar, of a cover therefor provided with a projection upon its upper side, a swinging bail with which said cover is loosely connected, and a second swinging bail adapted, when swung in one direction, to secure the cover, and when swung in another direction to contact with and support the cover when the latter is off from over the jar, substantially as specified.

2. The combination, with a jar, of a cover therefor provided with a projection upon its upper side, a bail with which said cover is loosely connected, provided with loops, and another bail pivoted in said loops and adapted to be swung over the cover to engage said projection, substantially as and for the purpose specified.

GEO. L. CARLL.

Witnesses:
MAURICE J. ROACH,
JAMES D. GRISWOLD.